United States Patent
Prümm

(10) Patent No.: US 11,268,460 B2
(45) Date of Patent: Mar. 8, 2022

(54) METHOD FOR OPERATING A GAS ENGINE

(71) Applicant: Keyou GmbH, Munich (DE)

(72) Inventor: Franz Werner Prümm, Koblenz (DE)

(73) Assignee: Keyou GmbH, Unterschleissheim (DE)

( * ) Notice: Subject to any disclaimer, the term of this patent is extended or adjusted under 35 U.S.C. 154(b) by 0 days.

(21) Appl. No.: 16/644,045

(22) PCT Filed: Sep. 5, 2018

(86) PCT No.: PCT/EP2018/073819
§ 371 (c)(1),
(2) Date: Mar. 3, 2020

(87) PCT Pub. No.: WO2019/048454
PCT Pub. Date: Mar. 14, 2019

(65) Prior Publication Data
US 2020/0277907 A1    Sep. 3, 2020

(30) Foreign Application Priority Data
Sep. 6, 2017 (DE) .................... 10 2017 120 512.8

(51) Int. Cl.
*F02D 41/00* (2006.01)
*F02D 41/40* (2006.01)
(Continued)

(52) U.S. Cl.
CPC ....... *F02D 41/0027* (2013.01); *F02D 41/402* (2013.01); *F02M 21/0209* (2013.01);
(Continued)

(58) Field of Classification Search
CPC ............... F02D 41/402; F02D 41/0027; F02D 2041/389; F02P 15/08; F02M 21/0206;
(Continued)

(56) References Cited

U.S. PATENT DOCUMENTS

| | | | | |
|---|---|---|---|---|
| 2002/0166515 A1* | 11/2002 | Ancimer | ................... | F02B 1/12 123/27 R |
| 2005/0000485 A1* | 1/2005 | Kuo | .................... | F02D 13/0242 123/299 |
| 2015/0308362 A1* | 10/2015 | Dunn | ................. | F02M 21/0215 123/300 |

FOREIGN PATENT DOCUMENTS

| | | |
|---|---|---|
| CA | 2799952 A1 | 3/2013 |
| DE | 10321794 A1 | 12/2004 |

(Continued)

OTHER PUBLICATIONS

PCT; App. No. PCT/EP2018/073819; International Search Report and Written Opinion dated Jan. 2, 2019.

*Primary Examiner* — Sizo B Vilakazi
(74) *Attorney, Agent, or Firm* — Fitch, Even, Tabin & Flannery, LLP

(57) ABSTRACT

The invention relates to a method for operating a gas engine having at least one combustion chamber, in particular for a motor vehicle, wherein a gaseous fuel is injected directly into the combustion chamber in order to operate the gas engine, the gaseous fuel being injected directly into the combustion chamber within a working cycle of the gas engine during at least two phases spaced apart from each other in time, the at least two phases beginning and ending before the first ignition occurring within the working cycle.

13 Claims, 1 Drawing Sheet

(51) Int. Cl.
*F02M 21/02* (2006.01)
*F02P 15/08* (2006.01)
*F02D 41/38* (2006.01)

(52) U.S. Cl.
CPC ......... *F02M 21/0275* (2013.01); *F02P 15/08* (2013.01); *F02D 2041/389* (2013.01)

(58) Field of Classification Search
CPC . F02M 21/0209; F02M 21/0275; Y02T 10/30
See application file for complete search history.

(56) References Cited

FOREIGN PATENT DOCUMENTS

| | | |
|---|---|---|
| DE | 10341089 A1 | 4/2005 |
| DE | 10359445 A1 | 7/2005 |
| DE | 102013016503 A1 | 8/2014 |
| DE | 102013013755 A1 | 2/2015 |
| DE | 102015009898 A1 | 2/2017 |
| DE | 102015015343 A1 | 6/2017 |
| EP | 1431564 A2 | 6/2004 |

* cited by examiner

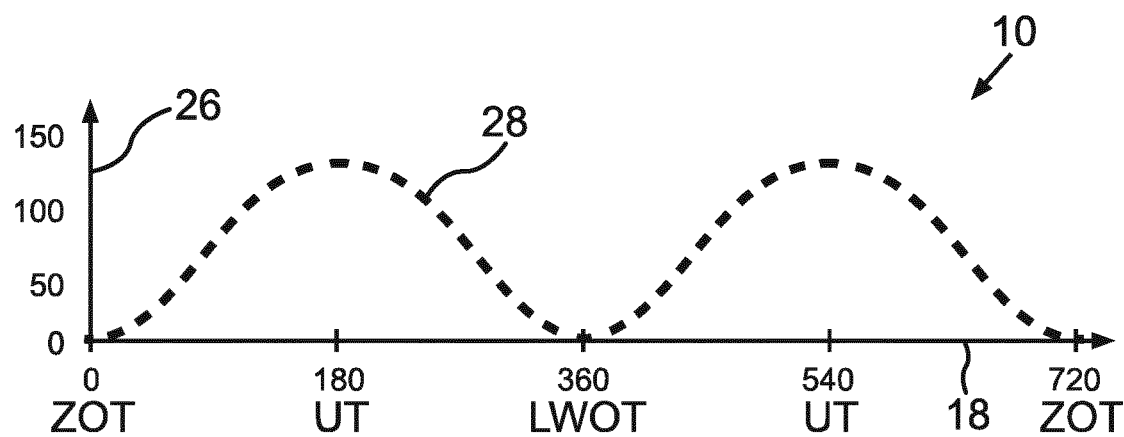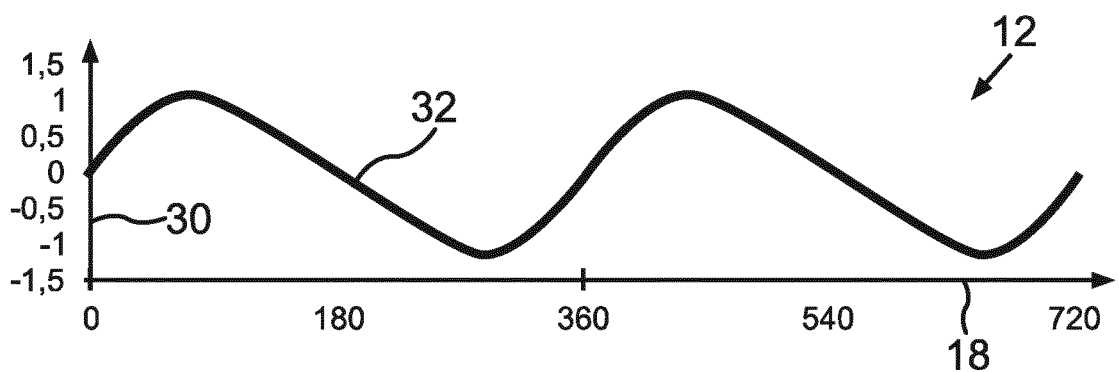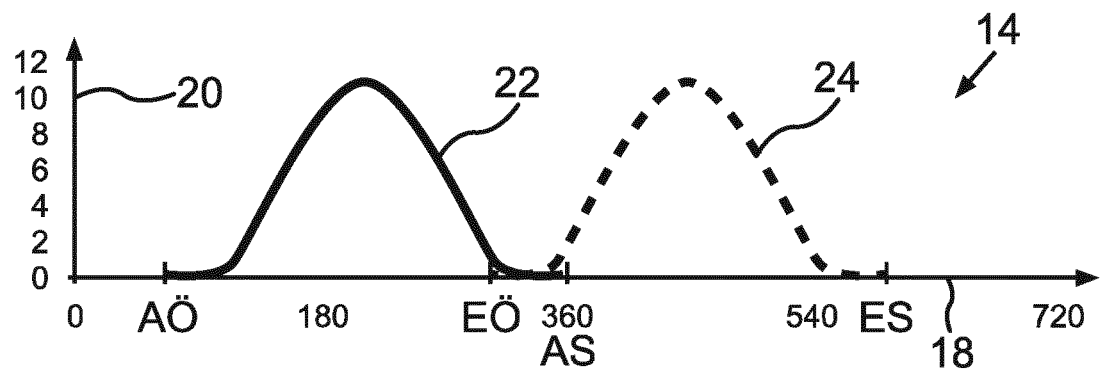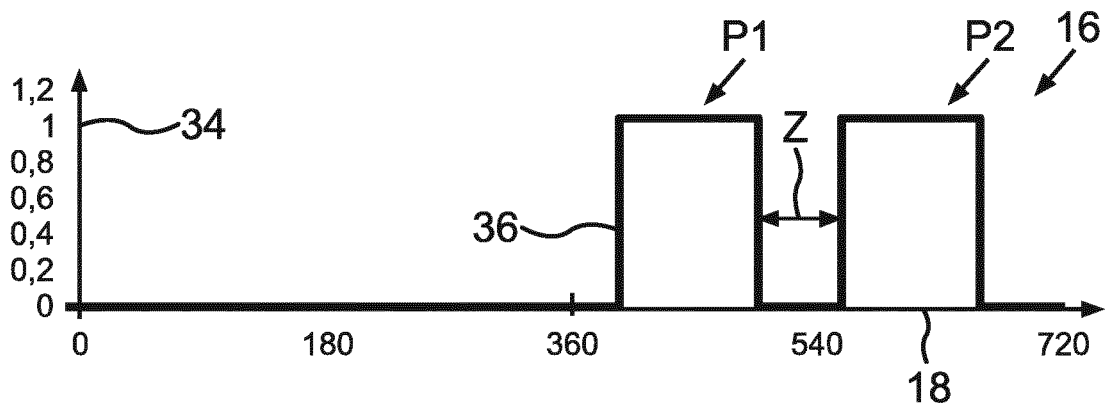

METHOD FOR OPERATING A GAS ENGINE

CROSS-REFERENCE TO RELATED APPLICATIONS

This application is a U.S. national phase application of International Application No. PCT/EP2018/073819, filed Sep. 5, 2018, designating the United States, which claims priority to German Patent Application No. 10 2017 120 512.8, filed Sep. 6, 2017.

FIELD

The invention relates to a method for operating a gas engine, in particular a hydrogen engine, in particular for a motor vehicle, according to the preamble of claim 1.

BACKGROUND

Such a method for operating a gas engine comprising at least one combustion chamber and for example formed as a hydrogen engine, in particular for a motor vehicle, can for example already be taken as known from DE 103 59 445 A1. In the method, a gaseous fuel, in particular hydrogen, for operating the gas engine, in particular in its fueled operation, is directly injected into the combustion chamber, wherein the gaseous fuel is directly injected into the combustion chamber within a working cycle of the gas engine during at least two phases spaced apart from each other in time.

Furthermore, EP 1 431 564 A2 discloses a method for an internal combustion engine operated with gas, wherein the gas is injected into a combustion chamber via an injection device and a stratified charge is generated.

Furthermore, a method for operating a gas-operated, in particular hydrogen-operated, internal combustion engine is known from DE 103 21 794 A1.

SUMMARY

It is the object of the present invention to further develop a method of the initially mentioned type such that a particularly advantageous operation of the gas engine is realizable.

According to the invention, this object is solved by a method comprising the features of claim 1. Advantageous configurations with convenient developments of the invention are specified in the remaining claims.

In the method according to the invention for operating a gas engine comprising at least one combustion chamber, in particular a hydrogen engine, in particular for a motor vehicle, a gaseous fuel, in particular hydrogen, for operating the gas engine, in particular in its fueled operation, is directly injected into the combustion chamber, wherein the gaseous fuel is directly injected into the combustion chamber within a working cycle of the gas engine during at least two phases spaced apart from each other in time. The gaseous fuel, in particular the hydrogen, is at least combusted together with air in the combustion chamber for example formed as a cylinder, whereby the gas engine is operated in particular in its fueled operation. In other words, the fueled operation of the gas engine is effected by the combustion of the gaseous fuel with air, wherein combustion procedures proceed in the combustion chamber within the scope of the fueled operation of the gas engine. Therein, the gas engine is for example in its traction operation, in which the motor vehicle, which is for example formed as a utility vehicle, can for example be driven or is driven by means of the gas engine.

Preferably, the gas engine is formed as a 4-stroke engine such that the working cycle comprises in particular exactly four strokes. The four strokes are: intake or intake stroke; compression and ignition or compression or concentration stroke; working or power stroke; exhaust or exhaust stroke. Within the scope of the invention, the working cycle of the gas engine is in particular viewed such that the first stroke occurring within the working cycle is the power stroke. The second stroke occurring within the working cycle and adjoining to the power stroke is the exhaust stroke. The third stroke occurring within the working cycle and adjoining to the exhaust stroke is the intake stroke such that the fourth stroke occurring within the working cycle and adjoining to the intake stroke is the compression stroke.

Therein, a piston is for example further movably accommodated in the combustion chamber in particular formed as a cylinder. In particular, the piston is accommodated translationally movable in the combustion chamber. The piston is coupled to an output shaft for example formed as a crankshaft in particular in hinged manner, wherein the gas engine is for example formed as an internal combustion engine in the form of a reciprocating piston engine. By the for example hinged coupling of the piston translationally accommodated in the combustion chamber to the output shaft, the translational movements of the piston are converted into a rotational movement of the output shaft. The gaseous fuel and the air form a fuel-air mixture in the combustion chamber, which is also simply referred to as mixture. The mixture is for example ignited and subsequently combusted, whereby the mixture and combustion products resulting from the combustion, respectively, expand. Hereby, the piston is driven and thereby for example moved from its top dead center to its bottom dead center. By the coupling of the piston to the output shaft, the output shaft is driven such that the gas engine can provide torques for driving the motor vehicle via the output shaft.

For combusting the mixture, it is ignited, in particular by extraneous ignition, and combusted as a result. Within the scope of the extraneous ignition, at least one ignition spark is generated, in particular in the combustion chamber, within the working cycle by means of an extraneous ignition device for example formed as a spark plug. The mixture is ignited by means of the ignition spark and combusted as a result. By combusting the mixture, it and combustion products resulting from the combustion, respectively, expand, whereby the piston is driven.

In the above described consideration of the working cycle, the piston for example moves starting from its top dead center or coming from its top dead center to its bottom dead center, then again to its top dead center, then to its bottom dead center and then again to its top dead center. Thus, the top dead center of the piston occurs exactly three times within the working cycle, while the bottom dead center of the piston occurs exactly two times within the working cycle.

Furthermore, it is differentiated between exactly two types of top dead centers. A first one of the types is the so-called top ignition dead center (ZOT), in the range of which the mixture is ignited. The second type is the so-called top charge changing dead center (LWOT), within the scope of which the piston performs the exhaust stroke and the intake stroke and therein shifts exhaust gas resulting from the combustion of the mixture out of the combustion chamber within the scope of the exhaust stroke and sucks fresh gas, that is in particular the previously mentioned air, into the combustion chamber within the scope of the intake stroke. Therein, in the above described consideration of the working cycle, the top charge changing dead center (LWOT) is between the bottom dead centers occurring within the working cycle such that the first bottom dead center of the piston occurring within the working cycle is between the top ignition dead center (ZOT) and the top charge changing dead center (LWOT). In other words, the first bottom dead center occurring within the working cycle immediately adjoins to the top ignition dead center, wherein the top charge changing dead center immediately adjoins to the first bottom dead center occurring within the working cycle.

Accordingly, the second bottom dead center of the piston occurring within the working cycle is between the top charge changing dead center and the top ignition dead center such that the second bottom dead center occurring within the working cycle immediately or directly adjoins to the top charge changing dead center and such that within the working cycle the top ignition dead center immediately or directly adjoins to the second bottom dead center occurring within the working cycle. Thus, the first top dead center occurring within the working cycle, at which—against the background of the above described consideration of the working cycle—the working cycle begins, is the top ignition dead center. The third top dead center occurring within the working cycle, at which the working cycle ends against the background of the above described consideration, is also the top ignition dead center such that the second top dead center of the piston occurring within the working cycle is between the top ignition dead centers and thus is the top charge changing dead center (LWOT).

Now, in order to be able to realize a particularly advantageous operation of the gas engine preferably formed as a hydrogen engine, it is provided according to the invention that the at least two phases begin and end in time before the or a first ignition occurring within the working cycle. In other words, in particular in the range of the top ignition dead center, at least or exactly one ignition is effected within the working cycle, within the scope of which—in particular in the described manner—for example at least one ignition spark is generated. If only or exactly one ignition is effected within the working cycle, thus, this exactly one ignition is the first ignition taking place or occurring within the working cycle, since further ignitions do not take place or occur. For example, if multiple ignitions are performed within the working cycle or multiple ignitions occur within the working cycle, wherein these multiple ignitions are consecutive in time and therein in particular spaced apart from each other in time, thus, the first ignition occurring within the working cycle is that one of the multiple ignitions, which occurs as the very first ignition in time within the described working cycle. Therein, the at least two or both phases begin and end in time before the first ignition occurring within the working cycle.

During a first one of the phases, a first amount or a first partial amount of the gaseous fuel is for example directly injected into the combustion chamber. During the second phase following the first phase in time and spaced apart from the first phase in time, a second amount or a second partial amount of the gaseous fuel is directly injected into the combustion chamber. Since both phases now begin and end before the first ignition, both partial amounts are, in particular commonly, combusted in the combustion chamber by means of the first ignition or by means of a combustion effected by the first ignition. In contrast to the prior art, it is thus not provided that at least one own, separate ignition and thus combustion is performed per phase and per partial amount, respectively, such that in contrast to the prior art, it is not provided within the scope of the method according to the invention that the respective partial amount is separately or independently combusted. In other words, within the scope of the method according to the invention and in contrast to the prior art, it is not provided that first the first partial amount and thereupon the second partial amount are respectively independently combusted, but the partial amounts are combusted commonly or at the same time and are for example commonly ignited by the first ignition occurring within the working cycle. Hereby, a particularly advantageous, in particular fueled, operation of the gas engine can be realized.

By the feature that the phases are spaced apart from each other in time, it is in particular to be understood that a period of time is provided between the phases within the working cycle, in which injection or introduction of the gaseous fuel into the combustion chamber is omitted. Thus, the first phase ends before the second phase begins.

By the feature that the gaseous fuel is directly injected into the combustion chamber, it is in particular to be understood that an internal mixture formation is provided or that the gas engine is operated with an internal mixture formation, within the scope of which the air, which is for example sucked into the combustion chamber by means of the piston, is mixed with the gaseous fuel only within the combustion chamber and not already upstream of the combustion chamber, for example in an intake tract of the gas engine.

In particular, the invention is based on the following realization: hydrogen is the only fuel for internal combustion engines, which does not have carbon molecules. Thereby, no or only very low pollutant emissions, for example caused by lubrification oil combustion, of the pollutant groups of carbon monoxide, carbon dioxide, hydrocarbon compounds and particles, arise in the combustion of hydrogen. Thus, the method according to the invention is particularly advantageously suitable for operating a hydrogen engine, but also for operating for other gas engines, which are for example operated with natural gas like CNG (compressed natural gas) or LPG (liquefied petroleum gas). The gas engine is for example operated as an Otto engine such that the mixture is preferably ignited by extraneous ignition.

Compared to conventional Otto engines, which are for example operated by means of fossil fuels, that is by means of gasoline, a gaseous fuel, in particular hydrogen, has some physical characteristics, which can aggravate an adaptation of a conventional Otto engine to the operation with hydrogen. One of these characteristics is the low density of the hydrogen compared to liquid fuel such as for example gasoline. By the low density, the hydrogen occupies a high volume portion of the combustion mixture, which includes at least air and the gaseous fuel as a combustible. In particular, the hydrogen occupies about one third of the volume of the mixture at a combustion air ratio of 1. The combustion air ratio is also referred to as lambda ($\lambda$) and relates—as is generally known—the mass of the air actually available for the respective combustion to the at least required stochiometric air mass, which is required for a complete combustion of the fuel. In other words, the hydrogen displaces air from the mixture. By the displacement of air by hydrogen, a low energy density of the mixture results, wherefrom—if corresponding countermeasures are not taken—a low power density of the gas engine simply also referred to as engine or internal combustion engine results. An engine identical in piston displacement will have a substantially lower power torque development with hydrogen operation than in the operation with conventional, in particular fossil fuels if corresponding countermeasures are not taken.

A possibility of counteracting this only low power density is the use of the internal mixture formation, in particular maintaining other characteristic features of the Otto engine such as for example extraneous ignition, quality control and mixture compression.

Surprisingly, it has been found that the direct blow-in or injection of the gaseous fuel, in particular the hydrogen, into the combustion chamber should only begin when for example an intake valve associated with the combustion chamber or intake valves associated with the combustion chamber, in particular all of the intake valves associated with the combustion chamber, are closed to thereby be able to at least nearly completely eliminate the previously described displacement effect.

A time available for mixture formation is determined by the pressure increase in the combustion chamber during the compression stroke. Therein, in order to for example ensure an advantageous supercritical passage of an injection device for example also referred to as injector, by means of which the gaseous fuel is directly injected into the combustion chamber, the pressure at an intake of the injector should always be more than twice the pressure at an exhaust and thus on an exhaust side of the injector, since the pressure at the exhaust or on the exhaust side for example corresponds to the internal pressure existing in the combustion chamber. The gaseous fuel is for example supplied to the injector or the gaseous fuel is introduced into the injector via the mentioned intake. The gaseous fuel is for example discharged from the injector via the mentioned exhaust, wherein the injector in particular directly injects the gaseous fuel into the combustion chamber via the exhaust. By this described pressure ratio, it can be ensured that a flow rate through the injector is independent of the pressure existing in the combustion chamber, whereby an exact metering of an amount of the fuel to be injected into the combustion chamber is possible. The amount of the fuel to be injected is also referred to as fuel amount or injection amount.

However, different disadvantages can result from the above described boundary conditions:

High intake pressure at the injector and a limited usability of the gaseous fuel stored in compressed-gas containers caused thereby and thereby a reduced range of the motor vehicle with hydrogen drive. In addition, according to construction, high forces are required for opening and closing the injector, in particular a valve of the injector, which implies high requirements to an in particular electrical drive, in particular for moving the valve, and to final stages of control electronics for controlling the injector.

Large opening cross-section of the injector, in particular of the valve of the injector. This means large masses to be moved and high requirements to the drive and to the final stages of the control electronics. The technical effort increases with the opening cross-section. Therefore, high development effort is required. High cost and long development times are the consequence.

By the low available time until ignition, a sufficient homogenization of the fuel-air mixture is not necessarily ensured. In too rich mixture ranges, high nitrogen oxide emissions ($NO_x$ emissions) can arise, in lean sections, delayed combustion and thereby reduced efficiency has to be expected.

A further advantage of the internal mixture formation is the at least nearly complete elimination of reignitions in the intake tract of the gas engine. Since the hydrogen for example arrives at the combustion chamber only after closing the intake valve, a spontaneous ignition of the mixture in the combustion chamber does not have any effect on the intake tract.

A possibility of counteracting the above described disadvantages is the use of a camshaft with early closing of the intake valve in the range of the bottom dead center, in particular of the second bottom dead center occurring within the working cycle. However, such a camshaft severely again restricts the useful effects of the internal mixture formation because with shortening of the intake time the valve stroke also has to be reduced for dynamical and mechanical reasons. A decrease of the delivery degree is the consequence.

The above described problems and disadvantages and target conflicts can now be solved and avoided by means of the method according to the invention, such that an operation particularly efficient and thus beneficial in efficiency as well as low in emission and fuel consumption is realizable.

In particular, a camshaft with control times is used, which are adapted to an at least nearly optimum filling of the combustion chamber. Further, an overall amount of the fuel overall to be injected into the combustion chamber within the working cycle is for example divided to the two phases and thus to the two partial amounts.

In advantageous configuration of the invention, a hydrogen engine is operated as the gas engine, wherein hydrogen is used as the gaseous fuel.

A further embodiment is characterized in that a first one of the phases first begins and ends, whereupon the second phase following the first phase in time begins and ends. Thereby, the phases are spaced apart from each other in time in defined manner.

In further configuration of the invention, the gas engine comprises at least one piston, which is translationally movably accommodated in the combustion chamber for example formed as a cylinder.

Therein, it has proven particularly advantageous if the first phase begins after the top charge changing dead center of the piston. Hereby, undesired reignition effects in the intake tract of the gas engine can for example be avoided such that a particularly effective and efficient operation can be represented.

It has proven particularly advantageous if the first phase ends before the bottom dead center immediately adjoining to the top charge changing dead center, that is for example before the second bottom dead center occurring within the working cycle. Hereby, a sufficiently long period of time for realizing an advantageous mixture formation is available, in particular until the first ignition occurs.

In order to introduce a sufficiently large amount of gaseous fuel, in particular of hydrogen, into the combustion chamber and consequently realize an effective and efficient operation as well as a high power density, it is provided in a further embodiment of the invention that—in particular related to the previously described consideration of the working cycle—the first phase extends from 400 degrees of crank angle (° KW) after the top ignition dead center (ZOT) to 500 degrees of crank angle after the top ignition dead center. Therein, "degree of crank angle" designates a respective rotational position of the drive shaft for example formed as a crankshaft as it is already sufficiently known from the general prior art. By this designation of the respective rotational position, the top dead centers and the bottom dead centers as well as further events occurring within the working cycle such as for example the ignition, the phases, in particular the duration, beginning and end thereof, as well as respective opening and closing points of time, at which for example respective gas exchange valves, in particular intake valves and exhaust valves, open and close, can be particularly advantageously simply referenced to respective rotational positions of the drive shaft.

In a particularly advantageous embodiment of the invention, it is provided that the second phase begins after the bottom dead center immediately adjoining to the top charge changing dead center. Hereby, a sufficient temporal distance between the phases can be ensured such that undesired displacement effects can be avoided or be kept particularly low. As a result, a high power density can be realized in simple manner.

It is further advantageous if the second phase immediately adjoins to the bottom dead center immediately adjoining to the top charge changing dead center. Hereby, a sufficiently large amount of fuel can be introduced into the combustion chamber.

It has further proven advantageous if the gaseous fuel is injected into the combustion chamber by means of the previously mentioned injector, wherein the second phase is preferably terminated before the compression pressure in the combustion chamber reaches or has reached a value, which is in a range from 40% to 60%, in particular from 45% to 55% and preferably from 48% to 52% of an injection pressure existing before the ejector, in particular at the intake thereof, by which the gaseous fuel is for example introduced into the injector, in particular via the intake thereof, and/or is directly injected into the internal space by means of the injector. In particular, the second phase is terminated before the compression pressure in the combustion chamber has reached a value, which is about 50% of the injection pressure. A pressure existing in the combustion chamber is to be understood by the compression pressure, wherein the compression pressure is caused by the compression stroke, that is in that the piston moves from its bottom dead center towards its top dead center and in particular towards the top ignition dead center within the scope of its compression stroke and therein compresses the mixture. Hereby, a sufficiently large total amount of the fuel can be injected into the combustion chamber and this in particularly advantageous manner since the second phase can be performed sufficiently long, but not excessively long.

A further embodiment is characterized in that the first phase, in particular at least predominantly or completely, occurs during a movement phase of the piston, in which the piston moves towards its bottom dead center—in particular with opened intake valve—with such a piston speed that backflow of the gaseous fuel from the combustion chamber into the intake tract of the gas engine is, in particular completely, omitted. Hereby, a particularly advantageous and efficient operation of the gas engine can be represented.

In a further embodiment of the invention, it is provided that the first phase begins after opening at least one intake valve associated with the combustion chamber, via which at least air is supplied to the combustion chamber. If for example multiple intake valves are associated with the combustion chamber, thus, it is preferably provided that the first phase begins after respectively opening the or all of the intake valves, via which at least air is supplied to the combustion chamber.

Therein, it was surprisingly found that a particularly effective and advantageous operation can be realized if the first phase ends before closing the intake valve or the intake valves immediately adjoining to the opening.

In a further particularly advantageous embodiment of the invention, the second phase begins before closing or with closing the intake valve or the intake valves. Thereby, a particularly high power density can be realized. In particular, a point of time is to be understood by closing the intake valve, at which the intake valve is, in particular completely, closed, that is reaches its closure position. Thus, the second phase begins before the intake valve is closed, that is before the intake valve reaches its closure position and thus for example while the intake valve moves towards its closure position. Alternatively, the point of time, at which the intake valve reaches its closure position, coincides with the beginning of the second phase. The point of time, at which the intake valve, in particular coming from its open position, reaches its closure position, is also referred to as "intake closes" or ES. Thus, it can be provided that the second phase begins before ES or the second phase begins with ES such that ES coincides with the beginning of the second phase.

Finally, it has proven particularly advantageous if the gaseous fuel flows through the injector in injecting, that is when the gaseous fuel flows through the injector, in particular from the intake thereof to the exhaust thereof, such that the gaseous fuel has a supercritical flow at the narrowest cross-section of the injector flowable by the gaseous fuel in injecting. Hereby, the gaseous fuel can be particularly advantageously introduced into the combustion chamber such that an efficient and effective operation can be represented.

Within the scope of development activities, it was in particular surprisingly found that it is particularly advantageous for realizing an effective and efficient operation if the first phase begins when the intake stroke of the piston or of the combustion chamber for example formed as a cylinder has progressed as far as at least the following conditions are satisfied:

A first one of the conditions is that the air flown into the combustion chamber, in particular via the intake valve or via the intake valves, cools the combustion chamber as far as ignition of the inflowing fuel is excluded.

The second condition is that a speed, with which the piston moves in particular towards its bottom dead center and therein in particular towards the second bottom dead center occurring within the working cycle, is as high as inflow of the air into the combustion chamber is not or only slightly impeded by a suction effect of the piston, in particular a bottom of the piston, and a backflow of hydrogen into the intake tract is excluded.

The first phase is terminated if the second condition is no longer satisfied for example by reduction of the previously mentioned speed also referred to as piston speed in the range of the top dead center.

The second phase can for example begin when the intake valve is physically closed. The second phase is for example completed when the required or provided hydrogen, that is when the presettable or desired overall amount of the gaseous fuel, has been injected. The injection of the fuel should be completed when the ratio of pressure existing in the cylinder to pressure of the gaseous fuel existing at the intake of the injector and thus before the injector exceeds the value of 0.5.

In particular, the following advantages can be realized by means of the method according to the invention:

A particularly high injection time can be realized, during which a sufficiently large amount of gaseous fuel can be injected into the combustion chamber. Compared to conventional methods, thus, a gain of injection time can be realized. By this gain of injection time, the pressure existing before the injector and/or a cross-sectional area of the injector can for example be reduced, wherein the gaseous fuel flows through the cross-sectional area in particular in injection.

At least a part of the gaseous fuel can be injected into a turbulent airflow, in particular during the intake stroke. Hereby, a considerably improved homogeneity of the fuel-air mixture results.

The division of the fuel injection into the two phases allows providing additional freedoms for optimizing the engine behavior in each characteristic map in particular for an engine application of the gas engine. Considering the parameters of operating safety, pollutant emission and efficiency.

By the injection of the fuel by means of the two phases, two working cycles of the injector are provided such that the first phase is effected by a first one of the working cycles and the second phase is effected by the second working cycle. An impairment of the lifetime of the injector possibly resulting from it can for example be counteracted in that the gaseous fuel is introduced into the combustion chamber by means of exactly one phase within the working cycle in at least one operating range of the gas engine such as for example in a partial and low load operating range, such that preferably exactly one phase occurs within the working cycle, during which the gaseous fuel is directly injected into the combustion chamber by means of the injector. In the application in particular with respect to the injection and intake and/or compression stroke and timing, the parameters of operating safety, pollutant emission and efficiency are to be considered here too.

Further advantages, features and details of the invention are apparent from the following description of a preferred embodiment as well as based on the drawing. The features and feature combinations mentioned above in the description as well as the features and feature combinations mentioned below in the description of FIGURE and/or shown in the single FIG. alone are usable not only in the respectively specified combination, but also in other combinations or alone without departing from the scope of the invention.

BRIEF DESCRIPTION OF THE DRAWINGS

The drawing shows in the single FIG. diagrams for illustrating a method according to the invention for operating a gas engine preferably formed as a hydrogen engine.

DESCRIPTION OF THE PREFERRED EMBODIMENTS

The single FIG. shows multiple diagrams 10, 12, 14 and 16, based on which a method for operating a gas engine is illustrated in the following. In the embodiment illustrated in the FIG., the gas engine is formed as a hydrogen engine such that the gas engine is operated by means of hydrogen as a gaseous fuel, in particular in its fueled operation. The gas engine is also referred to as combustion engine, internal combustion engine, combusting engine or engine and comprises at least one combustion chamber in particular formed as a cylinder, in which a piston is translationally movably accommodated. The cylinder is for example formed by an engine case of the gas engine. A drive shaft of the gas engine formed as a crankshaft is at least indirectly rotatably supported at the engine case such that the crankshaft can rotate around a rotational axis relative to the engine case. Therein, the piston is connected to a connection rod in hinged manner, which is in turn connected to the crankshaft in hinged manner. By this hinged coupling, the translational movements of the piston can be converted into a rotational movement of the crankshaft around its rotational axis.

Multiple intake valves and multiple exhaust valves are associated with the cylinder, wherein the intake valves and the exhaust valves are also referred to as gas exchange valves in summary. The respective gas exchange valve is, in particular translationally, movable between a closure position and at least one open position. On its way from the closure position into the open position and from the open position into the closure position, respectively, the respective gas exchange valve performs a stroke, which is also referred to as valve stroke. A respective point of time, at which it is begun with the opening of the respective intake valve, is also referred to as intake opens (EÖ). A respective point of time, at which the respective intake valve reaches its closure position, is also referred to as intake closes (ES). A respective point of time, at which it is begun with the opening of the respective exhaust valve, is also referred to as exhaust opens (AÖ). A respective point of time, at which the respective exhaust valve reaches its closure position, is also referred to as exhaust closes (AS). The respective gas exchange valve is for example actuated by means of a camshaft, in particular by means of a respective cam, and thereby moved from the respective closure position into the respective open position. Hereby, a return device, in particular a spring, is for example tensioned, by means of which the respective gas exchange valve can again be moved back from the closure position into the open position and be kept in the closure position.

Therein, the camshaft is drivable by the drive shaft. A respective rotation of the crankshaft by one degree is also referred to as degree of crank angle (° KW). The indication degree of crank angle thus characterizes a path or a distance, by which the crankshaft rotates. These degrees of crank angle are plotted on the respective abscissa 18 of the respective diagrams 10, 12, 14 and 16. Since the respective camshaft is driven by the crank shaft, the respective points of time, at which the respective gas exchange valves open and close, can be referenced to the rotational position and crankshaft, that is to the degrees of crank angle.

Therein, the gas engine is formed as a four-stroke engine such that the respective working cycle comprises four strokes. These four strokes are: power stroke; exhaust stroke; intake stroke; compression stroke. Further, the working cycle includes two complete revolutions of the crankshaft and thus 720 degrees of crank angle. Therein, exactly one working cycle of the gas engine is plotted on the respective abscissa 18.

The respective valve stroke is plotted on the ordinate 20 of the diagram 14, wherein a progression 22 registered in the diagram 14 illustrates the movement of the respective exhaust valve from exhaust opens to exhaust closes and thus from the closure position into the open position and again back into the closure position. Accordingly, a progression 24 registered in the diagram 14 illustrates the movement of the respective intake valve from intake opens up to intake closes and thus from the closure position into the open position and again back into the closure position. The progressions 22 and 24 are also referred to as valve lifting curves, wherein the respective points of time, at which the gas exchange valves are opened and closed, are also referred to as control times in summary.

In the method illustrated based on the FIG., the working cycle is now considered such that the first stroke taking place or occurring within the working cycle is the power stroke.

The second stroke taking place or occurring within the working cycle is the exhaust stroke adjoining to the power stroke. The third stroke occurring within the working cycle and adjoining to the second stroke or to the exhaust stroke is the intake stroke. Thus, the fourth stroke occurring or taking place within the working cycle is the compression stroke, which adjoins to the intake stroke.

The piston is translationally movable in the cylinder between a bottom dead center (UT) and a top dead center (OT). Against the background of the above described consideration of the working cycle, the top dead center occurs exactly three times within the working cycle, wherein the bottom dead center occurs exactly two times. Therein, it is differentiated between two types of the top dead center. A first one of the types is the so-called top charge changing dead center (LWOT), which occurs within the scope of the exhaust stroke and the intake stroke. The second type is the so-called top ignition dead center (ZOT), within the scope of which or in the range of which a fuel-air mixture also referred to as mixture is ignited. This mixture includes hydrogen as gaseous fuel, by means of which the gas engine is operated in its fueled operation. Further, the mixture includes air, which is supplied to the combustion chamber, in particular the intake valves.

The respective intake valve is associated with an intake port, via which the air can flow into the combustion chamber when the respective intake valve releases the respectively associated intake port in the open position. The fuel-air mixture is, in particular by means of extraneous ignition, ignited and thereby combusted, wherefrom exhaust gas of the gas engine results. Therein, a respective exhaust port is associated with the respective exhaust valve. When the respective exhaust valve releases the respective exhaust port, the exhaust gas can flow out of the combustion chamber via the exhaust port. The exhaust gas can then flow into an exhaust gas tract of the gas engine. For example, the air is passed to the and in particular into the cylinder by means of an intake tract of the gas engine. In the respective closure position, the respective intake valve fluidically blocks the respectively associated intake port, wherein the respective exhaust valve fluidically blocks the respectively associated exhaust port in the closure position.

Based on the diagram 10, it is apparent that the working cycle begins and ends at the top ignition dead center due to the described consideration such that the first top dead center of the piston occurring within the working cycle and the third and last, respectively, top dead center of the piston occurring within the working cycle is the top ignition dead center ZOT. As a result, the second top dead center occurring within the working cycle is the top charge changing dead center LWOT, which is between the first and the third top dead center of the working cycle. The first bottom dead center UT occurring within the working cycle immediately or directly adjoins to the first top dead center occurring within the working cycle and immediately or directly precedes the second top dead center occurring within the working cycle such that the first bottom dead center is between the first top ignition dead center and the top charge changing dead center. The second bottom dead center occurring within the working cycle immediately or directly adjoins to the top charge changing dead center and immediately or directly precedes the top ignition dead center such that the second bottom dead center occurring within the working cycle is between the top charge changing dead center and the top ignition dead center. By the respective bottom dead center immediately or directly adjoins to or precedes the respective top dead center, it is to be understood that another further dead center of the piston is not located between the respective bottom dead center and the respective top dead center.

On its way from the respective top dead center to the respective bottom dead center and inversely from the respective bottom dead center to the respective top dead center, respectively, the piston performs a stroke, which is also referred to as piston stroke. Therein, the piston stroke is plotted on the ordinate 26 of the diagram 10 such that a progression 28 registered in the diagram 10 illustrates the piston stroke, in particular the progression thereof, within the working cycle.

The piston moves from the respective top dead center to the respective bottom dead center and from the respective bottom dead center to the respective top dead center, respectively, with a speed also referred to as piston speed, which is plotted on the ordinate 30 of the diagram 12. Thus, a progression 32 registered in the diagram 12 illustrates the piston speed and the progression thereof, respectively, within the working cycle, wherein the piston speed is for example indicated in the unit millimeters per degree of crank angle. Based on the diagrams 10 and 12, it is in particular apparent that the piston speed in the respective bottom dead center and in the respective top dead center is zero.

In the method for operating the gas engine, an overall amount of the gaseous fuel formed as hydrogen is introduced into the cylinder within the working cycle and therein directly injected into the cylinder, in particular by means of an injector. This overall amount is now divided to exactly two partial amounts such that the overall amount or the gaseous fuel is directly injected into the cylinder within the working cycle during at least two phases P1 and P2 spaced apart from each other and consecutive in time. During the first phase P1, a first one of the partial amounts is directly injected into the cylinder by means of the injector. During the second phase P2 spaced apart from the first phase P1 in time and following the first phase P1 in time, the second partial amount is directly injected into the cylinder by means of the injector. Since the phases P1 and P2 are spaced apart from each other in time, a temporal distance Z is provided between the phases P1 and P2. The temporal distance Z is a period of time, during which the introduction of fuel, in particular gaseous fuel, into the cylinder is omitted.

The injector for example comprises a valve element, which is also referred to as valve or injector valve. The valve element is for example, in particular translationally, movable between a closure position and an open position. In the closure position, the valve element for example blocks at least one or more injection openings of the injector. In the open position, the valve element for example releases the injection opening or the injection openings such that the hydrogen can be directly injected into the combustion chamber via the injection openings. The injection opening or the injection openings is or are for example arranged at an exhaust and thus on an exhaust side of the injector, wherein the hydrogen is discharged from the injector via the exhaust. For example, the injector further comprises an intake and thus an intake side, via which the hydrogen to be directly injected into the cylinder by means of the injector is conducted into the injector. For example, a first pressure, in particular of the hydrogen, exists at the intake, wherein the first pressure is for example an injection pressure, with which the hydrogen is directly injected into the cylinder. For example, a second pressure exists at the exhaust, which is for example a pressure existing in the cylinder and also referred to as cylinder internal pressure. In particular, the cylinder internal pressure is a compression pressure, which for example occurs during and is caused by the compression stroke, respectively.

On its way from the closure position into the open position and inversely, respectively, the valve element for example travels a path or performs a stroke, which is also referred to as valve element stroke. This valve element stroke is for example plotted on the ordinate 34 such that a progression 36 registered in the diagram 16 illustrates the valve element stroke and the progression thereof within the working cycle, respectively.

The mentioned partial amounts result in the overall amount in total, which is absolutely directly injected into the cylinder during the working cycle. Thus, only or exclusively the overall amount is directly injected into the cylinder, in particular within the working cycle.

Now, in order to realize a particularly advantageous operation, exactly two partial amounts and thus exactly two phases P1 and P2 are provided. Furthermore, it is provided that the at least two phases P1 and P2 begin and end in time before the first ignition occurring within the working cycle.

For example, if exactly one ignition is performed or effected within the working cycle, within the scope of which the previously mentioned mixture is ignited and combusted as a result, thus, the previously mentioned first ignition occurring within the working cycle is this exactly one ignition. For example, if multiple ignitions spaced apart from each other and consecutive in time are performed within the working cycle, thus, the previously mentioned first ignition taking place or occurring within the working cycle, is for example the ignition, which is performed as the very first ignition of the multiple ignitions. Within the scope of the ignition, at least one ignition spark is generated for example by means of an extraneous ignition device formed in particular as a spark plug, by means of which the mixture is ignited and combusted as a result.

Since the phases P1 and P2 begin and end before the first ignition, the partial amounts are not combusted for instance separately from each other or independently, but together or commonly within the scope of the ignition or the combustion effected by the ignition. Thereby, a particularly high power density can be realized in simple manner.

It is particularly well apparent based on the progression 36 that the first phase P1 first beings and ends, whereupon the second phase P2 following the first phase P1 in time begins and ends. Therein, the first phase P1 begins after the top charge changing dead center LWOT of the piston. In addition, the first phase P1 ends before the further bottom dead center UT immediately adjoining to the top charge changing dead center LWOT such that the first phase P1 ends in time before the second bottom dead center occurring within the working cycle. Thus, the temporal distance Z begins before the second bottom dead center and extends up to after the bottom dead center.

It has proven particularly advantageous that—as is apparent from the FIG. and in particular from the diagram 16—the first phase P1 extends from 400 degrees of crank angle after the top ignition dead center to 500 degrees of crank angle after the top ignition dead center. Thus, the first phase P1 for example extends over 100 degrees of crank angle, whereby a sufficiently high amount of fuel can be injected.

The second phase P2 for example extends before or with ES and thus for example before or with intake closes ES immediately adjoining to the top charge changing dead center LWOT. This means that the second phase P2 begins after the second bottom dead center occurring within the working cycle. Alternatively, the beginning of the second phase P2 can, in particular with high fuel demand, begin before intake closes ES, in particular if it is excluded that fuel can enter into the intake tract through the opened intake valve. Thereto, the pressure increase in the cylinder effected by the fuel amount injected up to intake closes ES should be limited to a value below the pressure in the intake tract. This means that the fuel mass injectable before intake closes ES is limited.

Therein, it has proven particularly advantageous if the second phase P2 immediately adjoins to the bottom dead center immediately adjoining to the top charge changing dead center LWOT such that a distance between the second phase P2, in particular between the beginning thereof, and the second bottom dead center occurring within the working cycle is less than 50 degrees of crank angle, in particular less than 20 degrees of crank angle, in particular less than 10 degrees of crank angle and preferably less than 5 degrees of crank angle.

It has further proven particularly advantageous if the second phase P2 is terminated before the compression pressure in the cylinder reaches a value, which is in a range from 40% to 60%, in particular from 45% to 55%, of the injection pressure existing before the injector. In particular, the second phase P2 is terminated before the compression pressure is about 50% of the injection pressure.

Therein, the first phase P1 preferably occurs at least predominantly or completely during a movement phase of the piston, in which the piston moves with such a piston speed towards its bottom dead center that backflow of the gaseous fuel from the cylinder into the intake tract of the gas engine is, in particular completely, omitted.

In addition, it is apparent that the first phase P1 begins after intake opens and preferably after exhaust closes, and ends before intake closes immediately adjoining to the intake opens. Thus, the first phase P1 is for example completely between intake opens and intake closes.

Based on the progressions 22 and 24, it is apparent that a valve overlap is provided since intake opens is before exhaust closes. Further, it is provided that the second phase P2 begins after intake closes or during the closure of the intake valve. In the embodiment illustrated in the FIG., the second phase P2 begins before intake closes and ends after intake closes.

Finally, it is preferably provided that the gaseous fuel flows through the injector in injection such that the gaseous fuel has a supercritical flow at the narrowest cross-section of the injector flowable by the gaseous fuel in injection. This is advantageous in that a flow and thus a flow rate of the hydrogen flowing through the injector from the intake to the exhaust is then independent of the cylinder internal pressure existing on the exhaust side or at the exhaust, which is in particular of advantage because the cylinder internal pressure existing at the exhaust cannot be precisely known. The narrowest cross-section flowable by the hydrogen is also referred to as Laval cross-section of the injector. In particular, it is to be understood by the supercritical flow at the narrowest cross-section that sound velocity of the hydrogen appears at the narrowest cross-section, which is also referred to as design cross-section.

Performing the first phase P1 allows a particularly good homogenization of the mixture. The temporal distance Z is an intermission, by which excessive displacement effects can be avoided. Performing the second phase P2 allows introducing a sufficiently large amount of hydrogen into the cylinder. Therein, it is preferably provided that the second partial amount, which is directly injected into the combustion chamber during the second phase P2, is larger than the first partial amount, which is injected into the combustion chamber during the first phase P1. In particular, the end of the second phase P2 is for example determined by the cylinder internal pressure or by a pressure ratio of the injection pressure existing at the intake of the injector and cylinder internal pressure, as previously described.

The invention claimed is:

1. A method for operating a gas engine comprising at least one combustion chamber, the method comprising:
   directly injecting a gaseous fuel for operating a gas engine into a combustion chamber,
   wherein the gaseous fuel is directly injected into the combustion chamber within a working cycle of the gas engine during at least two phases spaced apart from each other in time,
   wherein the at least two phases begin and end in time before a first ignition occurring within the working cycle,
   wherein the first phase extends from 400 degrees of crank angle after a top ignition dead center of a piston to 500 degrees of crank angle after the top ignition dead center,
   wherein first, a first one of the phases begins and ends, whereupon the second phase following the first phase in time begins and ends, and
   wherein the gaseous fuel is injected into the combustion chamber by at least one injector, wherein the second phase is terminated before the compression pressure in the combustion chamber reaches a value, which is in a range from 40% to 60% of an injection pressure.

2. The method according to claim 1,
   wherein a hydrogen engine is operated as the gas engine, wherein hydrogen is used as the gaseous fuel.

3. The method according to claim 1,
   wherein the gas engine comprises the piston, which is translationally movably accommodated in the combustion chamber.

4. The method according to claim 3,
   wherein the first phase begins after a top charge changing dead center of the piston.

5. The method according to claim 4,
   wherein the first phase ends before a bottom dead center of the piston immediately adjoining to the top charge changing dead center.

6. The method according to claim 5,
   wherein the second phase begins after the bottom dead center of the piston immediately adjoining to the top charge changing dead center of the piston.

7. The method according to claim 6,
   wherein the second phase immediately adjoins to the bottom dead center of the piston immediately adjoining to the top charge changing dead center.

8. The method according to claim 3,
   wherein the first phase, at least predominantly or completely, occurs during a movement phase of the piston, in which the piston moves towards its bottom dead center with such a piston speed that backflow of the gaseous fuel from the combustion chamber into an intake tract of the gas engine is omitted.

9. The method according to claim 1,
   wherein the first phase begins after opening at least one intake valve associated with the combustion chamber, via which at least air is supplied to the combustion chamber.

10. The method according to claim 9,
    wherein the first phase ends before closing the intake valve immediately adjoining to opening.

11. The method according to claim 9,
    wherein the second phase begins before closing or with closing the intake valve.

12. The method according to claim 1,
    wherein the gaseous fuel is injected into the combustion chamber by at least one injector, wherein the gaseous fuel flows through the injector in injection such that the gaseous fuel has a supercritical flow at a narrowest cross-section of the injector flowable by the gaseous fuel in injection.

13. The method according to claim 1,
    wherein the second phase is terminated before the compression pressure in the combustion chamber reaches a value in the range from 45% to 55% of the injection pressure.

* * * * *